Figure 1:
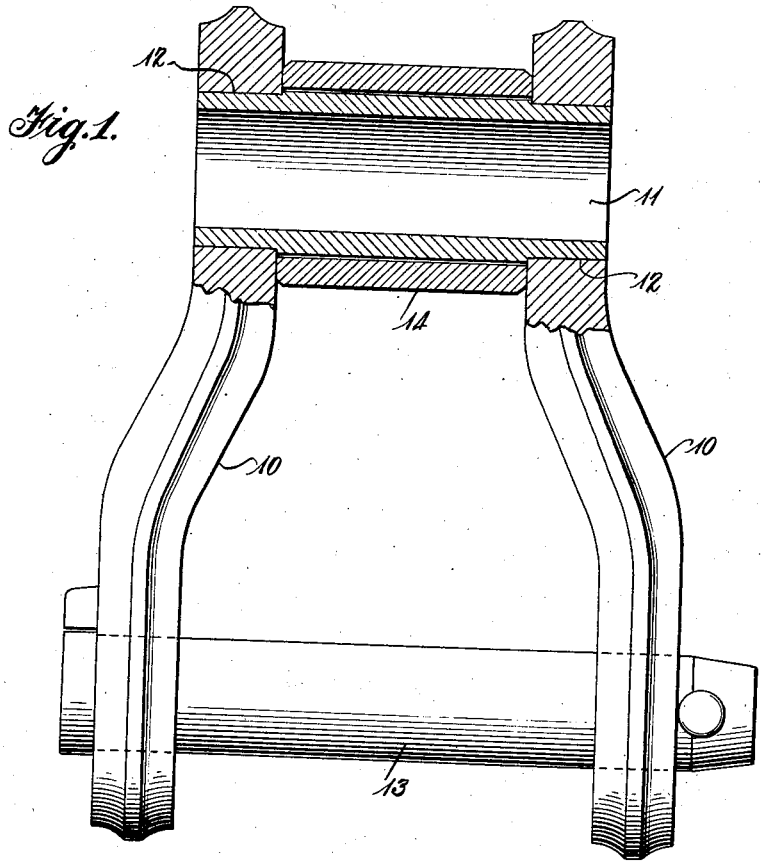

April 25, 1939.　　　　　C. R. WEISS　　　　　2,155,626
METHOD OF MAKING BUSHED CHAIN LINKS
Filed Jan. 24, 1938　　　2 Sheets-Sheet 1

Inventor
Charles R. Weiss

By L. Donald Myers
Attorney

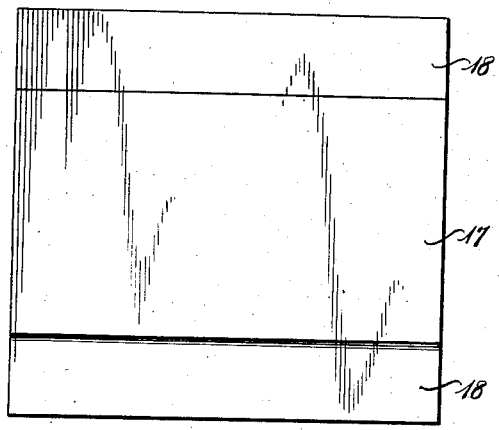
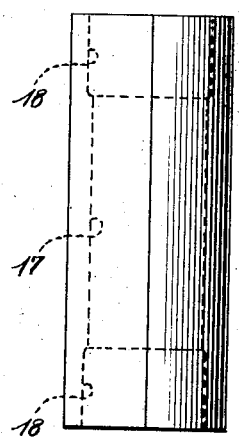
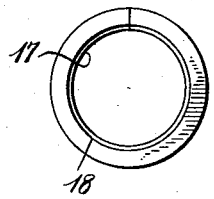
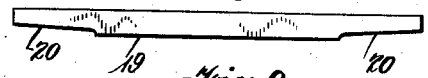
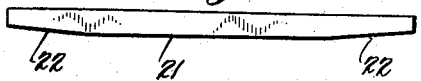

Patented Apr. 25, 1939

2,155,626

UNITED STATES PATENT OFFICE 2,155,626

METHOD OF MAKING BUSHED CHAIN LINKS

Charles R. Weiss, Indianapolis, Ind., assignor to Link-Belt Company, a corporation of Illinois Application January 24, 1938, Serial No. 186,716

17 Claims. (Cl. 59—8)

This invention relates to new and useful improvements in methods for making bushed chain links, either with or without rollers to engage sprocket wheels, and deals primarily with links for high speed drive chains and conveyor or drive chains intended to handle heavy loads.

In assembling chain links of the type including bushings attached to side bars, it is customary to press fit the ends of the bushings into the pitch holes of the side bars. The press fit is of such a degree of tightness as to maintain the bushings and side bars properly connected during use of the links.

To obtain the desired press fit, it is necessary to force the bushing ends into the side bar pitch holes with considerable pressure with the result that each end of a bushing, for a distance along the bushing length proportionate to the thickness of the associated side bar, is contracted until its outside diameter corresponds with the inside diameter of the side bar pitch hole. This contracting of the bushing ends is not absorbed within the thickness of the bushing wall but causes the bushing material to flow or be displaced radially inwardly resulting in partial closure of the ends of the bushing bore. The forces or stresses developed within the bushing wall, during press fitting of the ends in the side bar pitch holes, are not of sufficient magnitude at the central or middle portion of the bushing to cause contracting of the same simultaneously with the end portions. There is provided, therefore, a bushing with a bore which is of normal or original diameter at its central or middle portion and of reduced diameter at its end portions. This difference in diameters, although measured in thousandths of an inch, is sufficient to be definitely detrimental.

The effect of this non-uniform bore diameter condition is to reduce the unit bearing area which a bushing presents to the chain pin passing therethrough. This decrease in bearing area results in dangerously increasing unit bearing pressures and concentration of load at the contracted end portions of the bushing. Such a load concentration naturally results in more rapid wear. As the partial closure of the bushing bore at its end portions reduces the normal clearance between the bushing and chain pin, free entrance of a lubricant into the bushing bore is not permitted and improper lubrication results.

It is the primary object of this invention to provide methods for constructing bushed chain links which will eliminate the detrimental and undesirable features heretofore resulting from press-fitting bushings in side bars.

It is a further important object of the invention to provide methods for constructing bushed chain links which will still permit the bushings to be press fitted into side bar pitch holes but which will not result in reducing the end portions of the bushing bores to a diameter less than that of the central or middle portion.

A still further object of the invention is to provide methods of constructing bushed chain links which involve preliminary shaping of the end regions of bushings so that when the bushings are press fitted into side bar pitch holes, the bushing bores will have a substantially uniform diameter throughout their length.

Other objects and advantages of the invention will be apparent during the course of the following description.

Figure 2:
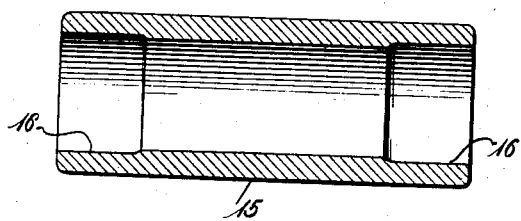
Figure 3:
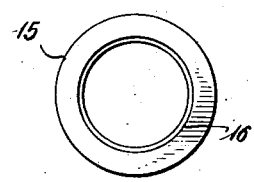

In the accompanying drawings forming a part of this specification and in which like numerals are employed to designate like parts throughout the same:

Figure 1 is a plan view, partly in section, of a chain link of the bushed and roller type which has been formed by the methods involving this invention, Figure 2 is a longitudinal sectional view of one form of bushing embodying this invention and fully constructed in readiness to be assembled with chain link side bars, Figure 3 is an end elevational view of the bushing structure disclosed in Fig. 2, Figure 4 is a plan view of a bushing section cut from a strip of bushing stock as a preliminary step in the formation of a bushing in accordance with one of the methods involving this invention, Figure 5 is a transverse sectional view of the bushing section disclosed in Fig. 4, Figure 6 is a plan view of a curled bushing which has been formed from the strip section illustrated in Fig. 4, Fig. 7 is an end elevational view of the curled bushing disclosed in Fig. 6, Figure 8 is an end edge elevational view of a slightly modified form of blank from which a curled bushing may be formed, and Figure 9 is a similar view to Fig. 8, but discloses a still further modified form of curled bushing blank.

In the drawings, wherein for the purpose of illustration are shown the preferred embodiments of this invention, and particularly referring to Fig. 1, there is disclosed one of several conventional forms of chain links. This link is of the type which is usually referred to as an offset link. At one end, the side bars are connected by a bushing, which, in this particular illustration, is provided with a roller.

This type of chain link has been chosen to illustrate the invention solely because of its simplicity of construction. It is to be understood, however, that the invention is not in any way to be limited to this particular form of link for the methods disclosed and claimed herein are applicable to every form of bushed chain link. Chain links manufactured by the methods disclosed and described herein find particular utility when employed in high speed drive chains and in conveyor or drive chains intended to handle heavy loads.

Specifically referring to Fig. 1, the reference character 10 designates the spaced side bars of the links. The side bars in this particular form of link are connected at one end by the bushing 11 which is press fitted at its ends into the pitch holes 12 formed in the side bars. This bushing not only functions to inter-connect and retain in proper operative position the side bars 10, but it receives the pin 13 of the next adjacent link for the purpose of pivotally connecting the two links. The chain pin 13 for the present link is illustrated as passing through pitch holes formed in the remaining ends of the side bars 10. The bushing 11 also functions as a bearing or journal for the roller 14 when the link is provided with such a roller to engage the sprocket wheels over which the chain, assembled from such link, is trained.

As has been stated above, it is the customary practice to connect chain link bushings and side bars by press fitting the ends of the bushings into the pitch holes of the side bars. In constructing the bushings and side bars which are to be assembled relative to each other, the outside diameter of the end portions of the bushing and the inside diameter of the pitch holes formed in the side bars are made of proper relative dimensions so that an extremely tight fit will be provided when the ends of the bushing are pressed into the side bar pitch holes. This press fitting, naturally, must be accompanied by a displacement of the material of one of the two press fitted elements. As the bushing is the weaker of the two elements, when considering the plane of the side bar, the displacement of material occurs in the bushing end. The bushing material is crowded or caused to flow radially inwardly. This displacement of the bushing material results in a partial closure or contracting of the end of the bushing bore.

The assembled link, therefore, has its bushing or bushings provided with bores of normal or intended diameter at the middle portion, or the portion occuring between the two side bars and of reduced diameter at the ends or the portions of the bushing length which correspond with the thicknesses of the side bars. When a chain pin, which has been formed or machined to a precise, uniform diameter, throughout its working length, is assembled in a bushing of this character, the unit bearing loads are applied to the pin solely at the contracted or reduced end portions of the bushing. This naturally results in load concentration at the ends of the bushing and unnaturally rapid wear.

Lubrication of the mating bearing surfaces of bushing bores and chain pins is normally accomplished by the feeding of lubricant into the opposite ends of the bushing bore. As the ends of the bushing bore are contracted or reduced, the normal, intended clearance is not provided between the chain pin and bushing bore. The proper amount of lubricant, therefore, is not fed to the mating bearing surfaces and improper lubrication results. The methods disclosed and claimed herein accomplish the constructing of chain links still by press fitting the bushing ends into side bar pitch holes but all of the above referred to objections and disadvantages are eliminated.

In Figs. 2 and 3, there is disclosed a bushing which has been formed in accordance with part of the steps of one of the methods involving this invention. This bushing consists of a solid body 15 which may be cut to proper length from either tubular bushing stock or a solid round bar which is subsequently bored. The bushing, as originally produced, is provided with a bore of uniform diameter throughout its length. This initial bore of the bushing section has what will be termed the normal or intended diameter. This bushing section is then re-bored at its opposite ends, as designated by the reference character 16. The lengths of these re-bored areas or end portions are proportionate to the width of the side bars 10 which are to be press fitted onto the ends of the bushing.

It is possible to calculate the amount of contraction which will occur in the end portions of a bushing press fitted into chain link side bars. This calculation takes into consideration the characteristics of the material from which the side bars and bushings are formed, the diameter of the side bar pitch hole as compared to the outside diameter of the bushing end portion and the thickness of the bushing wall. The depth of the re-boring or counter-boring of the end portions 16 of the bushing, preferably, should correspond with the amount of contracting of the bushing end portions which will result from press fitting the bushing into the side bar pitch holes. These counter-bored end portions 16 of the bushing, therefore, act as relief areas which will permit the end portions of the bushing to be contracted, during the press fitting operation, without resulting in any closure of the end portions of the bushing bore. If the counter-boring depth corresponds identically with the extent of contraction of the bushing ends, the assembled bushing will have, as is illustrated in Fig. 1, a bore of uniform diameter throughout its length. The radial inward flowing or displacement of the material at the end portions of the bushing will cause the bore surfaces at the ends of the bushing to be displaced inwardly until they truly register with the bore surface of the central or middle portion of the bushing. The assembled bushing, therefore, has a bore of uniform diameter throughout its length which is the normal or intended diameter. The outside diameter of the bushing has been reduced at the press fitted end portions but the central or intermediate portion is not disturbed and still has a uniform diameter which forms a proper bearing for a roller 14, if such a roller is included in the assembly.

It is to be understood that the depth of counter-boring disclosed in Figs. 2 and 3 and the extent of radial inward displacement of the bushing ends as a result of press fitting the same into pitch holes of side bars is considerably magnified in the various disclosures of this invention to better enable a person viewing the drawings to appreciate just what physical changes take place.

In Figs. 4 to 9, inclusive, the method steps employed for producing curled bushings embodying this invention are illustrated. Figs. 4 to 7 illustrate one such form of bushing. The remaining two figures illustrate blanks from which modified forms of bushings may be constructed.

Curled bushings normally are constructed by first rolling or drawing a strip of bushing metal stock into a ribbon of proper width and thickness. This ribbon then is cut into suitable lengths and each length or section is then curled or shaped into the desired tubular bushing form.

Figs. 4 and 5 disclose a section of bushing stock which has been rolled or drawn to provide a middle portion or area 17 which is of normal and uniform thickness throughout its width. The longitudinal side edge portions 18 have been produced of reduced thickness relative to the thickness of the middle portion 17. Figs. 6 and 7 disclose a curled bushing which has been formed from the blank or section disclosed in Figs. 4 and 5. In curling or shaping the bushing of Figs. 6 and 7, the bushing blank has been shaped to arrange the portions of reduced thickness at the opposite ends of the bushing and with the reduction in thickness affecting the bore diameter at the ends of the bushing. In other words, the outside diameter of this curled type of bushing is uniform throughout the bushing length. The middle portion 17 of the bushing blank provides the central or middle portion of the bushing bore which is of uniform diameter and of a diameter which is desired in the assembled bushing. The regions of reduced thickness 18 of the blank provide the counter-bored portions corresponding with the areas 16 referred to in connection with the bushing of Figs. 2 and 3. When this curled bushing is press fitted into chain link side bars, the end portions are displaced radially inwardly, as described in connection with the bushing of Figs. 2 and 3 to accomplish the same result; namely, a final assembled bushing with a bore of uniform diameter throughout the bushing length.

The disclosures of Figs. 2 to 7, inclusive, show pre-assembled bushings with counter-bored end portions which are truly cylindrical or of uniform diameter throughout the bored areas. It is to be understood, however, that these counter-bored end portions need not be truly cylindrical. They, for example, may be tapered or of frusto-conical form. Figs. 8 and 9 are employed to disclose this tapered or frusto-conical counter-boring in blanks from which curled bushings are to be formed. It is to be understood, however, that solid tube bushings of the type disclosed in Figs. 2 and 3 also may be provided with such tapered or frusto-conical counter-bore areas.

The bushing blank disclosed in Fig. 8 is provided with a middle portion 19 which is of uniform diameter throughout its width. The end areas 20 are of reduced diameter throughout their widths but the reduction in diameter varies to provide, in a curled bushing, a tapered counter-bore area at each end of the bushing.

The blank disclosed in Fig. 9 includes a middle portion or area 21 which is of uniform diameter throughout its width. Starting with the side edges of this middle portion or area 21, the areas or portions 22 are formed of gradually reduced thickness to provide tapered or frusto-conical areas at the ends of a bushing bore formed from this bushing blank.

Bushings constructed from the blanks of Figs. 8 and 9 will possess relief areas at their opposite ends which will permit the bushing ends to be contracted without resulting in displacement of material to such an extent as to produce contracting or closing of the ends of the bushing bore beyond the normal or intended diameter of said bore which is formed by the middle portion of each bushing.

If final inspection of chain links formed by the methods disclosed herein shows that manufacturing tolerances have been exceeded in some of the links with the result that such links show an excessive contracting of the end portions of the bushings, it is not necessary to reject these links. A suitable boring tool may be run through the bores of the slightly defective bushings to remove material from the ends of the bushing bores which has been displaced radially inwardly beyond the surface of the central or middle portion of the bushing bore. This re-boring of the bushing bores will render such rejectable links entirely satisfactory.

It is to be understood that the forms of this invention herewith shown and described are to be taken as preferred examples of the same, and that various changes in the shape, size and arrangement of parts may be resorted to without departing from the spirit of the invention or the scope of the subjoined claims.

Having thus described the invention, I claim:

1. A method of constructing bushed chain links which comprises the steps of forming a bushing with relief areas at the opposite ends of its bore, and press fitting the ends of the bushing into side bar pitch holes which have an inside diameter sufficiently less than the outside diameter of the bushing ends to effect, as a result of said press fit, flow of the material of the bushing ends radially inwardly to fill said relief areas.

2. A method of constructing bushed chain links which comprises the steps of forming a bushing with the central or middle portion of its bore of a desired final diameter and with the end portions having diameters greater than said desired diameter to form relief areas, and press fitting the ends of the bushing into side bar pitch holes each of which has an inside diameter sufficiently less than the outside diameter of its associated bushing end to effect, as a result of said press fit, contracting of the material of the bushing ends radially inwardly to reduce the diameter of said relief areas to substantially the diameter of the central or middle portion of the bushing bore.

3. A method for constructing bushed chain links which comprises the steps of forming a bushing with a uniform outside diameter and a non-uniform bore diameter, the differences in bore diameter occurring between the central or middle portion and the end portions, and effecting a press fit of the end portions of the bushing into pitch holes of side bars, said press fitting resulting in flow of the material forming the bushing which renders the said outside diameter non-uniform and the bore diameter uniform.

4. A method for constructing bushed chain links which comprises the steps of forming a bushing with a central or middle portion of the bore of a desired final uniform diameter and with end portions, each of a length proportionate to the thickness of a side bar of a link, having diameters greater than said desired diameter to form relief areas, and press fitting the ends of the bushing into side bar pitch holes which have an inside diameter sufficiently less than the outside diameter of the bushing ends to effect, as a result of said press fitting, contracting of the material of the bushing ends radially inwardly to reduce the diameter of said relief areas to substantially the diameter of the central or middle portion of the bushing bore.

5. A method for constructing bushed chain links which comprises the steps of forming a bushing of uniform outside diameter throughout its length and with a wall thickness which is less at the end portions than at the central or middle portion, and press fitting said end portions into pitch holes of side bars, said press fitting resulting in closure of the said end portions of the bushing to an extent which will provide the bushing with a bore of substantially uniform diameter throughout its length.

6. A method for constructing bushed chain links which comprises the steps of forming a bushing by counter-boring the end portions of a section of tubular bushing stock to provide relief areas at the ends of the bushing bore, and press fitting the end portions of the bushing into side bar pitch holes which have an inside diameter that is so related to the outside diameter of the bushing end portions as to result in contracting said end portions to an amount substantially equal to the depth of the said counter-boring, whereby the assembled bushing will have a bore of substantially uniform diameter throughout its length.

7. A method for constructing bushed chain links which comprises shaping a strip of bushing stock so that it will possess a longitudinal middle portion of uniform thickness and longitudinal edge portions of reduced thickness relative to the middle portion, curling a section of said stock into tubular form with the portions of reduced thickness occurring at the ends of the tube and arranged to provide a bushing having a bore with enlarged end areas, and press fitting the ends of the bushing into side bar pitch holes, said press fitting resulting in contracting the end portions, which are of reduced thickness, sufficiently to close in the said enlarged end areas and render the bushing bore of uniform diameter throughout its length.

8. A method for constructing bushed chain links which comprises the steps of forming a bushing cut from a section of tubular bushing stock with truly cylindrical counter-bores at its opposite ends, and press fitting the end portions of the bushing into side bar pitch holes which have an inside diameter that is so related to the outside diameter of the bushing end portions as to result in contracting said end portions to an amount substantially equal to the depth of the said counter-boring, whereby the assembled bushing will have a bore of substantially uniform diameter throughout its length.

9. A method for constructing bushed chain links which comprises the steps of forming a bushing cut from a section of tubular bushing stock with tapered counter-bores at its opposite ends, and press fitting the end portions of the bushing into side bar pitch holes which have an inside diameter that is so related to the outside diameter of the bushing end portions as to result in contracting said end portions to an amount substantially equal to the depth of said counter-boring, whereby the assembled bushing will have a bore of substantially uniform diameter throughout its length.

10. A method for constructing bushed chain links which comprises shaping a strip of bushing stock so that it will possess a longitudinal middle portion of uniform thickness and longitudinal edge portions of uniform thickness but reduced relative to the middle portion, curling a section of said stock into tubular form with the portions of reduced thickness occurring at the ends of the tube and arranged to provide a bushing having a bore with enlarged end areas, and press fitting the ends of the bushing into side bar pitch holes, said press fitting resulting in contracting the end portions, which are of reduced thickness, sufficiently to close in the said enlarged end areas and render the bushing bore of uniform diameter throughout its length.

11. A method for constructing bushed chain links which comprises shaping a strip of bushing stock so that it will possess a transverse cross section of uniform thickness at the middle and outwardly tapering sides, curling a section of said stock into tubular form with the tapering portions occurring at the ends of the tube and arranged to provide a bushing having a bore with frusto-conical end areas, and press fitting the ends of the bushing into side bar pitch holes, said press fitting resulting in closure of said frusto-conical end areas.

12. A method of constructing bushed chain links which comprises the steps of forming a bushing with truly cylindrical relief areas at the opposite ends of its bore, and press fitting the ends of the bushing into side bar pitch holes which have an inside diameter sufficiently less than the outside diameter of the bushing ends to effect, as a result of said press fitting, flow of the material of the bushing ends radially inwardly to fill said relief areas.

13. A method of constructing bushed chain links which comprises the steps of forming a bushing with tapered relief areas at the opposite ends of its bore, and press fitting the ends of the bushing into side bar pitch holes which have an inside diameter sufficiently less than the outside diameter of the bushing ends to effect, as a result of said press fitting, flow of the material of the bushing ends radially inwardly to fill said relief areas.

14. A method for constructing bushed chain links which comprises press fitting a tubular bushing into the pitch holes of a pair of side bars which are connected and held spaced by said bushing, said press fitting resulting in contracting of the portions of the bushing received in said pitch holes, and finally machining only the end portions of the bore of the bushing to remove material in the planes of the side bars which, as a result of said contracting, has effected a partial closure of the bushing bore.

15. A method for constructing bushed chain links which comprises press fitting a tubular bushing into the pitch holes of a pair of side bars which are connected and held spaced by said bushing, said press fitting resulting in contracting of the portions of the bushing received in said pitch holes and a partial closure of the end portions of the bushing bore while leaving the central portion of the bushing bore of original diameter, and finally machining the end portions only of the bushing bore to remove just enough of the material forming said partial bore closures to provide the bore of the assembled bushing with a uniform diameter throughout its length which corresponds with the original diameter of the central portion of the bore.

16. A method for constructing bushings for chain links, or the like, which comprises forming a tubular bushing blank with a bore having an annular relief area at each end thereof which is of greater diameter than the diameter of the central portion of the bore and which extends into the bore a distance substantially equal to the thickness of the chain link side plate to which the bushing end is to be connected.

17. A method of constructing bushings for chain links, or the like, which comprises the steps of shaping a strip of flat bushing stock so as to form a longitudinally extending middle portion of uniform thickness throughout its width and a longitudinally extending chamfered portion at each edge of the strip, which is of uniform thickness but which thickness is less than the thickness of the middle portion, and curling a section of said shaped stock into bushing form with the chamfered edges occurring at the ends of the bushing and within its bore to form internal relief areas.

CHARLES R. WEISS.